(12) United States Patent
Kim et al.

(10) Patent No.: US 8,055,274 B2
(45) Date of Patent: Nov. 8, 2011

(54) PORTABLE TERMINAL

(75) Inventors: Chang-Il Kim, Gyeonggi-Do (KR);
Hyun-Seock Song, Seoul (KR);
Jae-Gon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 12/267,323

(22) Filed: Nov. 7, 2008

(65) Prior Publication Data

US 2009/0124294 A1    May 14, 2009

(30) Foreign Application Priority Data

Nov. 12, 2007 (KR) .................. 10-2007-0115085
Nov. 13, 2007 (KR) .................. 10-2007-0115685

(51) Int. Cl.
*H04B 1/38* (2006.01)

(52) U.S. Cl. ............... 455/456.1; 455/566; 310/331; 715/863; 463/31

(58) Field of Classification Search .......... 355/456.1, 355/566; 310/331; 715/863; 463/31
See application file for complete search history.

(56) References Cited

U.S. PATENT DOCUMENTS

2006/0152112 A1 * 7/2006 Sasaki .................. 310/331
* cited by examiner

*Primary Examiner* — Phuoc Doan
(74) *Attorney, Agent, or Firm* — Birch, Stewart, Kolasch & Birch, LLP

(57) ABSTRACT

Disclosed is a portable terminal capable of enhancing compatibility with a hearing aid. The portable terminal comprises a terminal case having a sound hole thereon; a receiver installed inside the sound hole; and a reflection unit disposed between the terminal case and the receiver, for reflecting an electromagnetic wave radiated from an interior or a surface of the terminal case so as to minimize leakage of the electromagnetic wave to outside of the terminal case.

17 Claims, 13 Drawing Sheets

PORTABLE TERMINAL

RELATED APPLICATION

The present disclosure relates to subject matter contained in priority Korean Applications No. 10-2007-0115085 filed on Nov. 12, 2007, and No. 10-2007-0115685 filed on Nov. 13, 2007, which are herein expressly incorporated by reference in their entireties.

BACKGROUND OF THE INVENTION

1. Field of the Invention

The present invention relates to a portable terminal, and more particularly, to a portable terminal capable of enhancing a Hearing Aid Compatibility (HAC) rating by providing a shielding unit that prevents an electromagnetic wave occurring from an antenna from propagating to a measuring region for the HAC rating.

2. Background of the Invention

In general, a portable terminal is a device that can be carried around and has one or more functions such as to perform voice and video call communications, inputting and outputting information, storing data, and the like.

As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

Various attempts have been made to implement complicated functions in such a multimedia device by means of hardware or software. For instance, a user interface environment is provided in a portable terminal to enable a user to easily and conveniently search for or select a desired function among available functions.

While the portable terminal transmits or receives wireless signals, an electromagnetic wave may occur. Since the electromagnetic wave may be harmful to a human's body or other electronic components, a structure to shield the electromagnetic wave is required.

Furthermore, the electromagnetic wave occurring from the portable terminal may badly influence on a device such as a hearing aid. To solve this problem, there have been provided technical methods to enhance a Hearing Aid Compatibility (HAC) rating of a portable terminal when a hearing aid approaches to a receiver that outputs call sound of the portable terminal.

SUMMARY OF THE INVENTION

Therefore, an object of the present invention is to provide a portable terminal capable of enhancing a Hearing Aid Compatibility (HAC) rating by minimizing interference with a hearing aid.

Another object of the present invention is to provide a portable terminal capable of enhancing a Hearing Aid Compatibility (HAC) rating by minimizing leakage of an electromagnetic wave radiated from a receiver or a portion near the receiver to a peripheral space of a hearing aid, without changing structures of an antenna and a conductive member connected to the antenna.

Still another object of the present invention is to provide a portable terminal capable of implementing a configuration to enhance a Hearing Aid Compatibility (HAC) rating through a simplified design.

To achieve these and other advantages and in accordance with the purpose of the present invention, as embodied and broadly described herein, there is provided a portable terminal, comprising: a terminal case having a sound hole thereon; a receiver installed inside the sound hole; and a reflection unit disposed between the terminal case and the receiver, for reflecting an electromagnetic wave radiated from an interior or a surface of the terminal case.

Here, the terminal case may include a conductive layer disposed near the receiver. The conductive layer may be connected to a ground of the portable terminal, and an electromagnetic wave may be radiated to the air from the conductive layer when performing a call or transmitting/receiving data. In order to minimize radiation of an electromagnetic wave occurring from a portion near the receiver, a surface current near the receiver is preferably restricted.

Here, the reflection unit may include a ground layer disposed inside the conductive layer, and electrically insulated from the conductive layer; and an impedance layer disposed inside the ground layer and having a parallel configuration of unit cells, wherein each unit cell includes a capacitance component and an inductance component. The impedance layer is configured such that an electromagnetic wave occurring from an antenna or other components inside the terminal case is reflected to an opposite direction to a direction of the receiver without passing through the impedance layer.

In order to reduce an amount of an electromagnetic wave occurring from the conductive layer, the conductive layer and the impedance layer may be electrically shorted to each other by a connection member. The conductive layer may be arranged at an outermost side of the terminal case, and may be formed of an Electromagnetic Interference (EMI) spray. Since a surface current flowing onto the conductive layer is shifted to the impedance layer, reflection of an electromagnetic wave on the surface of the case is minimized.

Here, the ground layer and the impedance layer may be spaced apart by a dielectric material. The impedance layer is formed as any one of Jerusalem cross, Uniplane Compact Photonic BandGap (UC-PBG) and a loop.

The reflection unit may be formed as any one of Printed Circuit Board (PCB) type, printing type, and in-mold type. A display unit for outputting visual information may be installed at a lower side of the receiver, and the reflection unit may be arranged at an upper side of the display unit. The reflection unit may be formed on a front portion and a side portion of the terminal case.

The reflection unit may be implemented as an Artificial Magnetic Conductor (AMC) that reflects an electromagnetic wave inside the terminal case without phase changes.

According to another aspect of the present invention, there is provided a portable terminal, comprising: a terminal body having a plurality of cases, and having an antenna formed at an inner space formed by the cases therein, the antenna through which an electromagnetic wave radiates for wireless communications; a receiver installed in any one of the plurality of cases so as to be exposed out through the case; and a shielding unit formed on at least one surface of the plurality of cases, for shielding an electromagnetic wave radiated from the antenna and propagated to the receiver. Here, a virtual measuring region for an electric field due to an electromagnetic wave is set at a side of the receiver. Accordingly, an electromagnetic wave propagated to the receiver is shielded by the shielding unit, thereby enhancing an HAC rating.

The shielding unit may be configured to have a coverage extending from a region in which the receiver is installed to a neighboring region. And, the shielding unit may be formed to be extending to a window in which a display unit is located.

Preferably, the shielding unit formed of a conductive material and laminated onto one surface of the cases may be extending within a range not to interfere with the antenna. Here, the antenna may be installed at a position far from the shielding unit.

Here, at least one portion of the conductive material of the shielding unit may be transparent. The conductive material may include Indium-Tin Oxide (ITO), and have a meshed pattern. Here, the meshed pattern may be implemented as a first group of lines and a second group of lines are perpendicular to each other. The lines may be extending so as to be substantially parallel to a lengthwise direction or a width direction of the terminal body.

The shielding unit may be arranged so as to be closer to outside than any other conductive members arranged at the terminal body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

The US Hearing Aid Compatibility (HAC) Act serves to test and ensure compatibility between a wearer's hearing aid and a portable terminal without interference with each other. The HAC Act is being applied to manufacturers for wireless devices such as hearing aids and portable terminals. The HAC act was legislated by the Federal Communications Commission (FCC). In the United States, manufacturers for wireless devices are required to ensure manufactured products for sales meet certain ratings.

A method for measuring a HAC rating of a portable terminal will be explained with reference to FIG. 1.

Figure 1:
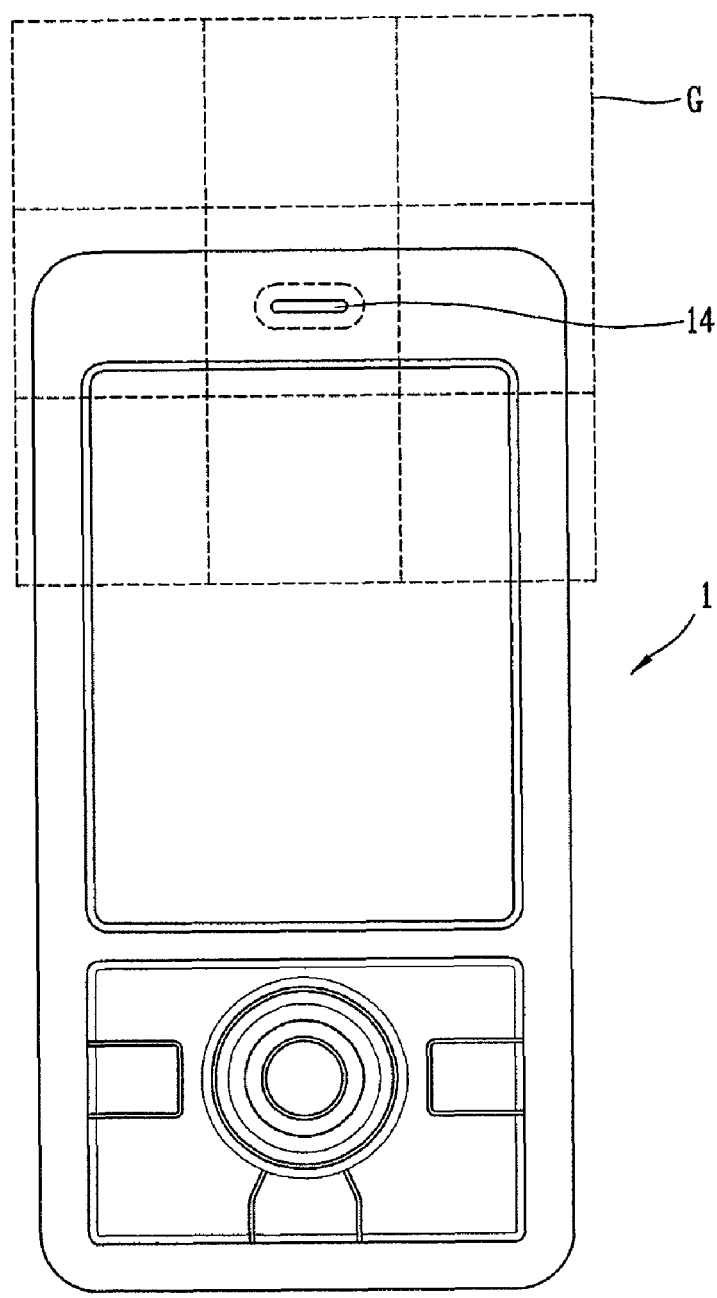
FIG. 1 is a conceptual view showing a setting status of a grid for measuring a Hearing Aid Compatibility (HAC) rating of a portable terminal.

FIG. 1 is a conceptual view showing a setting status of a grid for measuring a Hearing Aid Compatibility (HAC) rating of a portable terminal. The HAC rating is measured in a call mode under a state that the portable terminal 1 is fixed onto a supporting member.

A grid (G) includes a plurality of sub regions so as to measure a strength of an electromagnetic wave according to each position. In the USA, the grid (G) is composed of 9 sub-regions formed centering around a receiver 14 in a space far from the surface of the portable terminal 1 by 1 cm.

The HAC rating is measured based on an E-field or an H-field, or the like measured by a probe with respect to each sub-region under a state that a receiver 14 is activated. In order to measure a HAC rating, electromagnetic waves of the sub-regions (1~9) excluding the center sub-region and three sub-regions having relatively high field strengths of electromagnetic waves are measured. That is, a highest field strength of electromagnetic waves measured with respect to the rest five sub-regions serves as a peak value to determine a HAC rating.

Enhancing an HAC rating is directly related to decreasing electromagnetic waves of the sub-regions, which will be explained in more detail.

Figure 2:
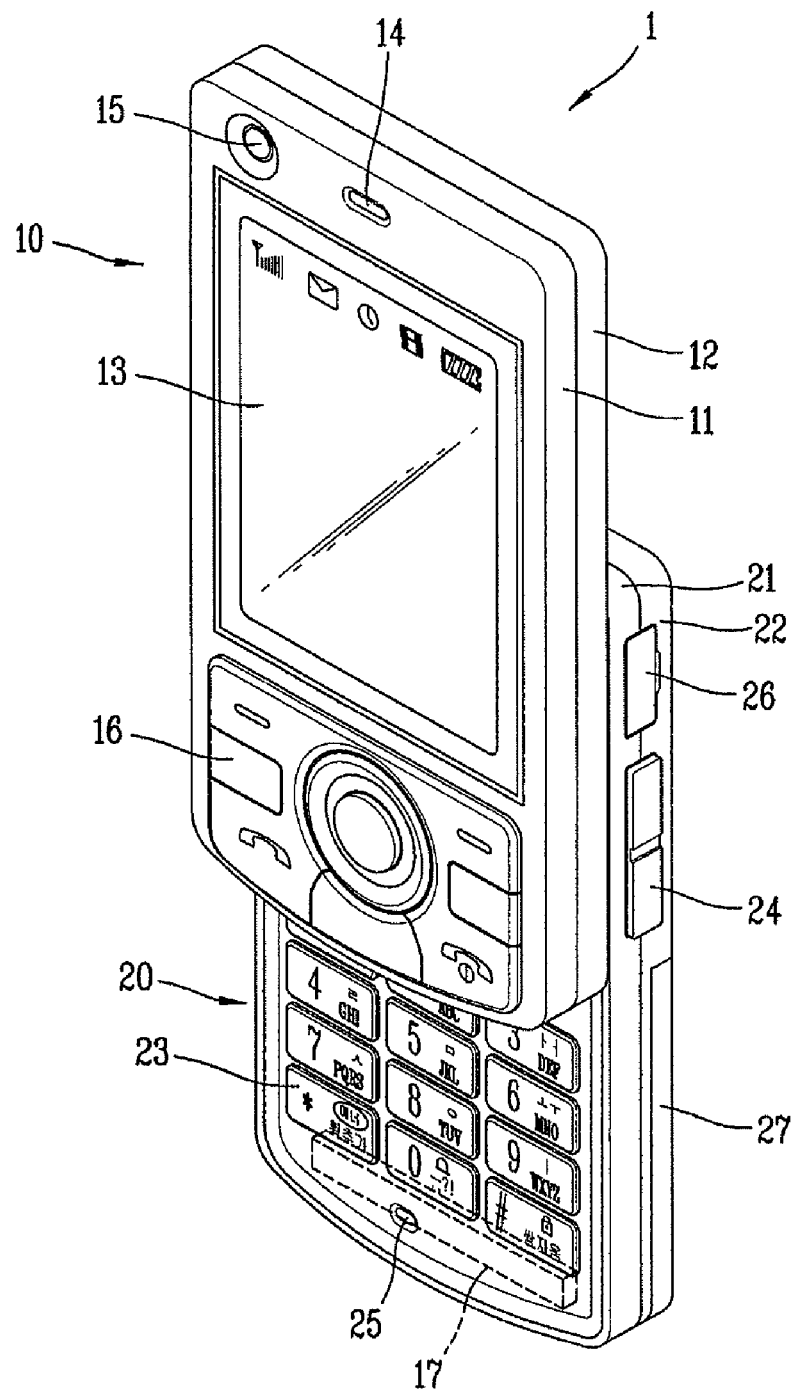
FIG. 2 is a front perspective view showing a portable terminal according to a first embodiment of the present invention.

FIG. 2 is a front perspective view showing a portable terminal according to a first embodiment of the present invention. As shown in FIG. 2, the portable terminal 1 includes a first body 10, and a second body 20 configured to slidably cooperate with the first body 10 in one or more directions of the first body 10.

A status that the first body 10 is disposed to overlap the second body 20 is referred to as 'closed configuration', and a status that the first body 10 exposes at least one part of the second body 20 is referred to as 'open configuration'.

Typically, the portable terminal 1 functions in a standby mode when in the closed position, and a call mode when in the open position. However, the call mode may be converted into a standby mode by a user's manipulation or lapse of a certain time.

A case (casing, housing cover, etc.) that forms the appearance of the first body 10 is formed by a first front case 11 and a first rear case 12. Each kind of electronic components are mounted to a space formed by the first front case 11 and the first rear case 12.

One or more intermediate cases may be provided between the first front case 11 and the first rear case 12. The front and rear cases may be formed by injection-molding synthetic resin, or formed using metallic material such as stainless steel (STS) and titanium (Ti).

On the first body 10, may be disposed a display unit 13, a receiver 14, a first video input unit 15, or a first user input unit 16.

The display unit 13 may be implemented as a Liquid Crystal Display (LCD) module or an Organic Light Emitting Diodes (OLED) module, and so on. The display unit 13 may also be configured as a touch screen allowing information to be input by a user's touch.

The receiver 14 may output not only a call sound, but also each kind of alarming sounds of a system, or play sounds for multimedia, and so on.

The first video input unit 15 may be implemented as a camera module to capture still images or moving images of a user and so on.

In the same manner as the first body 10, the second body 20 may include a second front case 21 and a second rear case 22.

On the second body 20, i.e., on a front surface of the second front case 21, may be disposed a second user input unit 23.

A third user input unit 24, an audio input unit 25, and an interface unit 26 may be disposed on at least one of the second front case 21 and the second rear case 22.

The first to third user input units 16, 23 and 24 may be referred to as manipulating portions, and may be implemented in a user's tactile manner.

For instance, the user input unit may be implemented as a dome switch or a touch screen or a touch pad that can receive commands or information in a user's push or touch manner, or may be implemented as a jog wheel or a joystick.

In the aspect of functions, the first user input unit 16 serves to input commands such as start, stop, and scroll, and the second user input unit 23 serves to input numbers, or characters, or symbols. The third user input unit 24 may serve as hot keys to perform specific functions such as activation of the first video input unit 15.

The audio input unit 25 may be implemented as a microphone to receive a user's voice, another sound, etc.

The interface unit 26 serves as a passage through which the portable terminal 1 of the present invention can exchange data with external devices. The interface unit 26 may be implemented by wire or by radio, and may include one of an access port to an earphone, a short-range communication port (e.g., IrDA port), a Bluetooth port, a wireless LAN port, and a power supply port for supplying power to the portable terminal.

The interface unit 26 may be a card socket for receiving an external card such as a subscriber identification module (SIM), a User Identification Module (UIM), and a memory card for storing information.

A power supply unit 27 for supplying power to components of the portable terminal 1 is mounted to the second rear case 22. The power supply unit 27 may be detachably mounted to the second rear case 22 as a chargeable battery.

Figure 3:
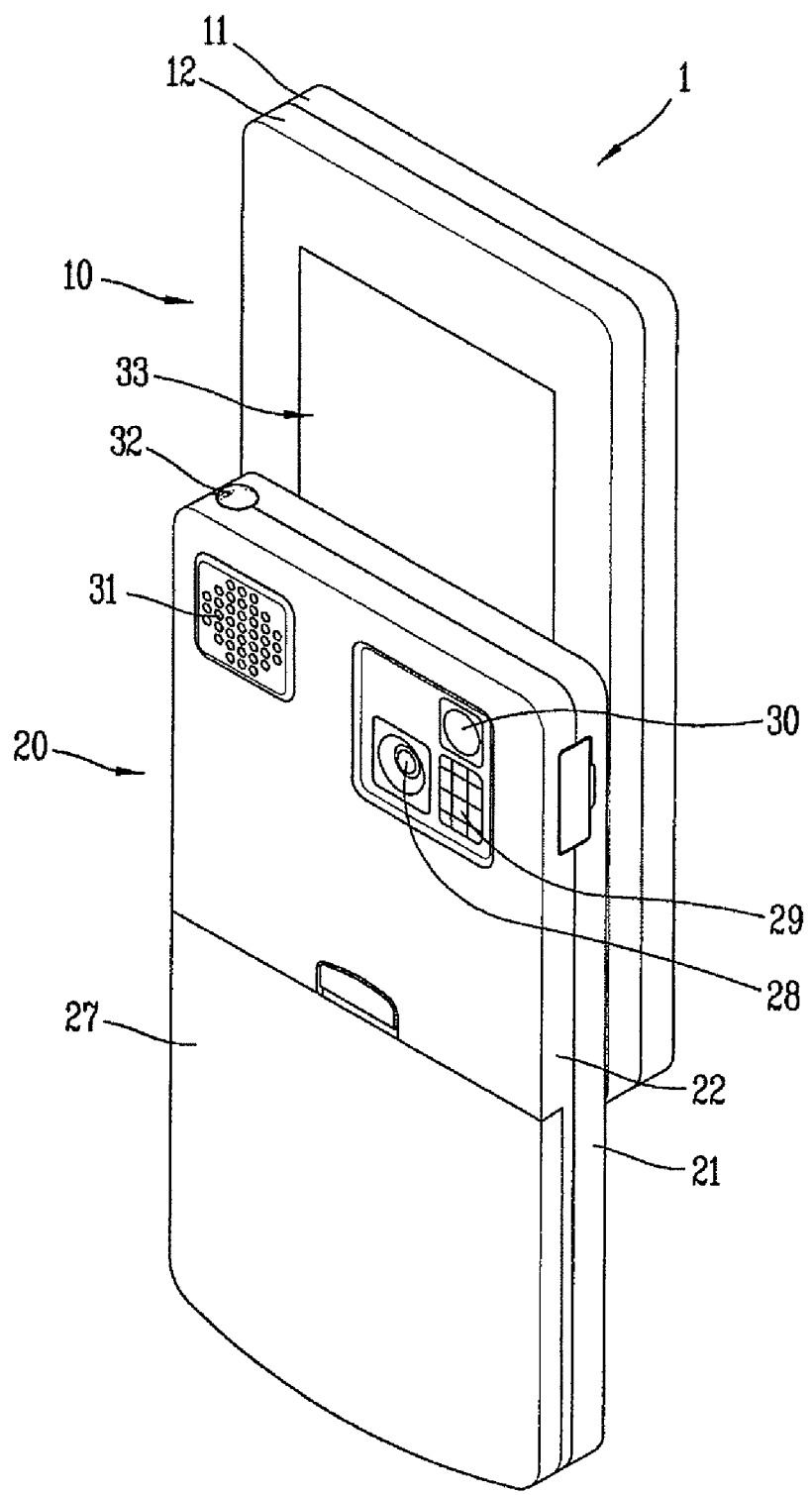
FIG. 3 is a rear perspective view showing the portable terminal of FIG. 2.

FIG. 3 is a rear perspective view of the portable terminal of FIG. 2.

Referring to FIG. 3, a second video input unit 28 may be additionally mounted to a rear surface of the second rear case 22 of the second body 20. In addition, the second video input unit 28 may be a camera implementing a capturing direction opposite to that of the first video input unit 15, and implementing a capability different from that of the first video input unit 15. For example, the first video input unit 15 operates with a relatively low resolution, whereas the second video input unit 28 operates with a relatively high resolution since a captured image is not immediately transmitted.

A flash 29 and a mirror 30 are additionally disposed near the second video input unit 28. The flash 29 provides light to a subject being captured by the second video input unit 28, and the mirror 30 is useful for assisting a user to position the second video input unit 28 in a self-portrait mode.

A speaker 31 may be additionally disposed at the second rear case 12. The speaker 31 may also cooperate with the receiver 14 to provide stereo output. Moreover, either or both of the speaker 31 and the receiver 14 may be configured to operate as a speakerphone. The receiver 14 and the speaker 31 may be referred to as audio output units.

The portable terminal 1 may also include a broadcast signal receiving antenna 32, rather than an antenna for call, at one side of the second body 20. The antenna 32 may be installed at the second body 20 so as to drawn-out.

Further, the first rear case 12 of the first body 10 includes a slide module 33, of which one part slidably couples the first body 10 and the second body 20 with each other.

Another part of the slide module 33 may be disposed at the second front case 11 of the second body 20 with a non-exposed status as shown in the drawing.

In the present invention, the second video input unit 28 and so on are disposed at the second body 20. However, the position of the second video input unit 28 is not limited thereto. For instance, at least one of the components explained to be disposed at the second rear case 12 such as the second video input unit 28 may be also mounted to the first body 10, especially, to the first rear case 12. In this case, components disposed at the first rear case 12 in the closed configuration can be protected by the second body 20. Furthermore, it may be configured to form only the first video input unit 15 without the second video input unit 28. Here, the first video input unit 15 is rotatably formed to capture an object that can be captured by the second video input unit 28.

In addition, the portable terminal 1 of the present invention is not limited to the slide type of terminal shown in FIGS. 2 and 3, but may be applied to various portable terminals such as folder type and swing type of terminals.

Figure 4:
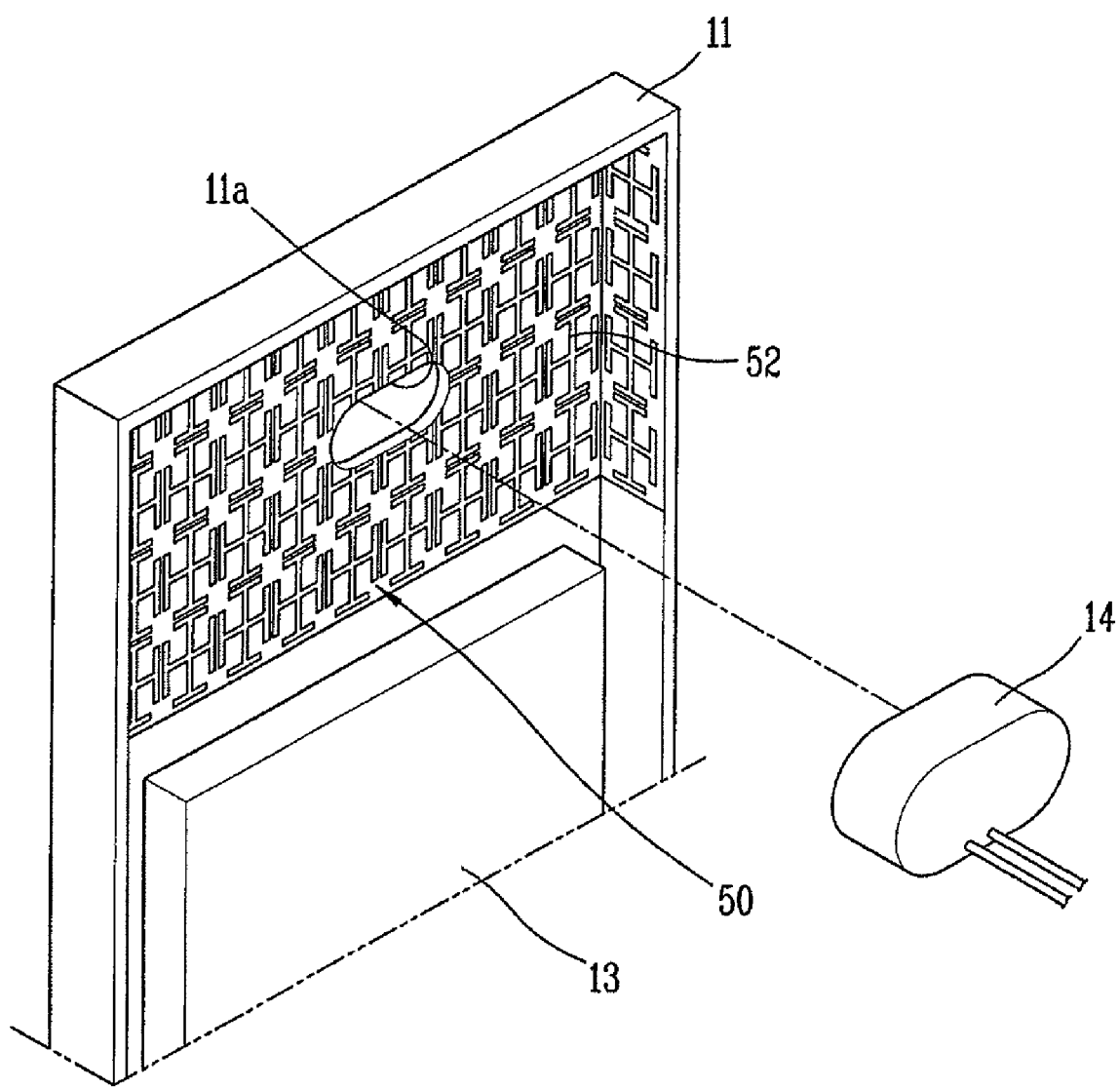
FIG. 4 is a perspective view showing an inner surface of a front case of the portable terminal of FIG. 2.

FIG. 4 is a perspective view showing an inner surface of a front case of the portable terminal of FIG. 2.

Referring to FIG. 4, a sound hole 11a to which sound occurring from the receiver 14 is transmitted is formed at an upper end of the first front case 11 of the first body 10 where the receiver 14 is installed.

A reflection unit 50 for reflecting an electromagnetic wave occurring from the first body 10 to an opposite direction to the sound hole 11a without causing leakage of the electromagnetic wave to an outer direction of the sound hole 11a is provided near the sound hole 11a on an inner surface of the first front case 11.

Since the receiver 14 may be disposed at an upper side of the display unit 13 for a user's call, the reflection unit 50 is formed at an upper side of the display unit 13.

The reflection unit 50 is formed to have a pattern implemented through patch or strip processes for a conductor. The reflection unit 50 may be formed as any one of a Printed Circuit Board (PCB) type, a printing type, and an in-mold type inside a front surface and a side surface of the first front case 11.

Figure 5:
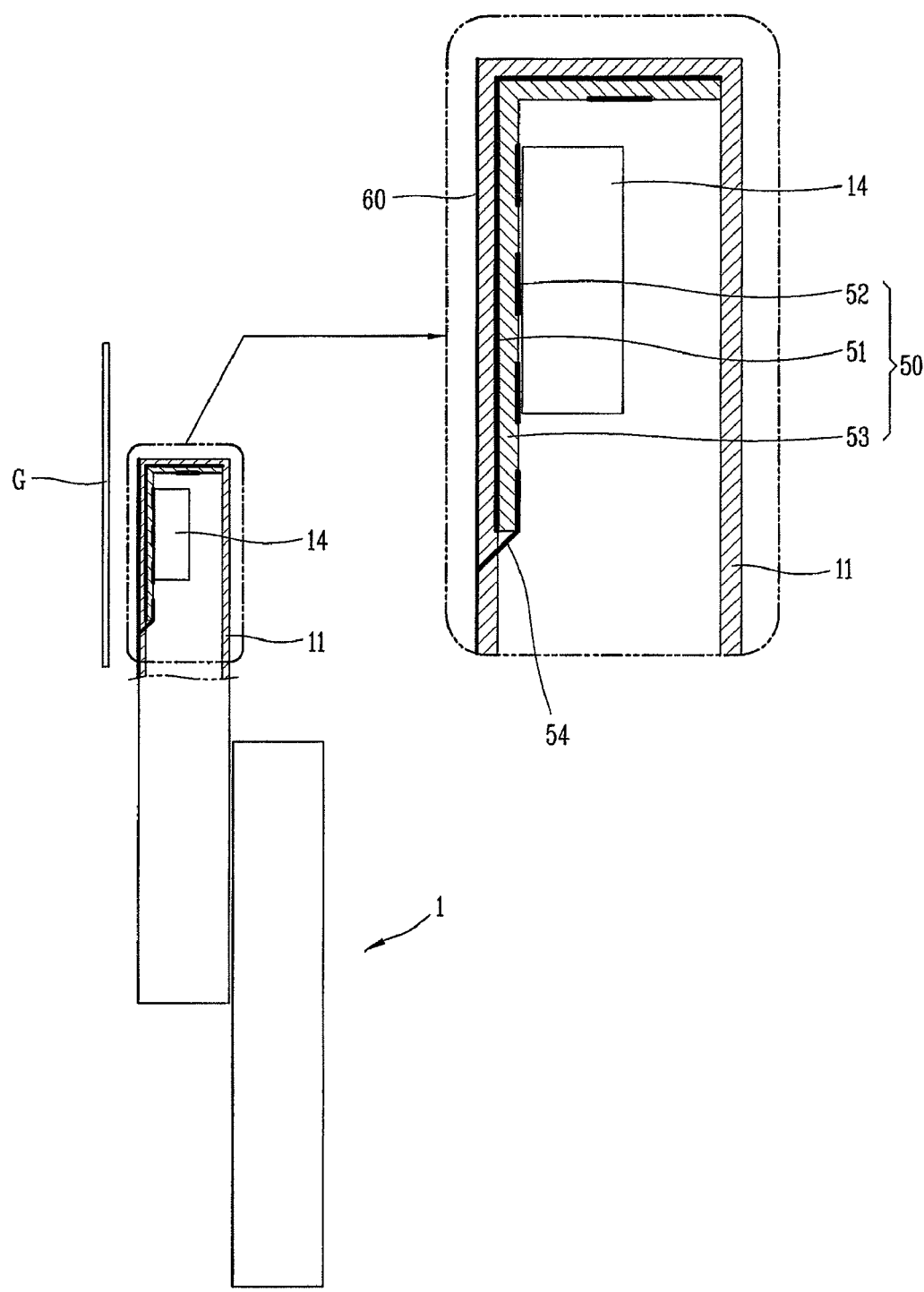
FIG. 5 is a partial side sectional view showing the portable terminal of FIG. 2.

FIG. 5 is a partial side sectional view showing the portable terminal of FIG. 2.

Referring to FIG. 5, a conductive layer 60 may be formed near the receiver 14 outside the first front case 11. A ground layer 51 and an impedance layer 52 are disposed inside the conductive layer 60, respectively.

The conductive layer 60 may be implemented as a metallic decoration member attached onto the non-conductive first front case 11. Alternatively, the conductive layer 60 may be implemented as the first front case 11 is formed of a metallic material. Also, the conductive layer 60 may be formed of am Electromagnetic Interference (EMI) spray deposited on an inner wall of the non-conductive first front case 11. In any of the above cases, the conductive layer 60 is disposed outside the reflection unit 50. That is, the conductive layer 60 arranged near the receiver 14 is not removed at a scan region (where the grid G is located) is for measuring an HAC rating.

The conductive layer 60 is electrically insulated from the ground layer 51 by an insulating means. Referring to FIG. 5, the conductive layer 60 and the ground layer 51 are electrically insulated from each other by the non-conductive first front case 11. For this, the first front case 11 may be formed to have a dielectric constant.

A dielectric substance 53 having a dielectric constant (Er) is filled between the ground layer 51 and the impedance layer 52.

The impedance layer 52 is disposed inside the ground layer 51, and is implemented as a plurality of unit cells disposed in parallel. Here, each unit cell includes a capacitance component and an inductance component. The impedance layer 52 serves to reflect an electromagnetic wave occurring from an antenna or other components inside the first front case 11 in a direction opposite thereto without passing therethrough.

In order to minimize an electromagnetic wave that may occur from the conductive layer 60 from occurring near the receiver 14, a surface current near the receiver 14 is restricted. For this, the conductive layer 60 and the impedance layer 52 are electrically shorted to each other by a connection member 54.

When the conductive layer 60 is arranged outside the first front case 11, the connection member 54 may be implemented as a via hole or a through hole, or a metallic member inserted into the first front case 11, or a coupling screw. Accordingly, a surface current flowing on the conductive layer 60 is forcibly shifted to the impedance layer 52. This reduces radiation of an electromagnetic wave from the surface of the first front case 11.

Figure 6:
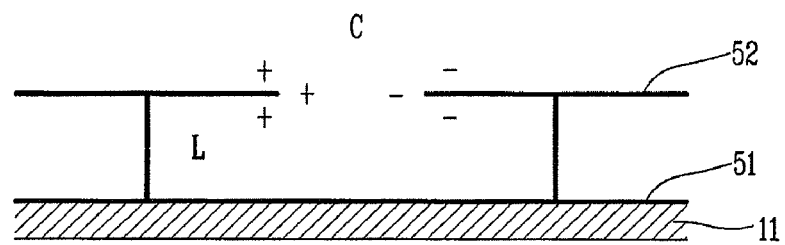
FIG. 6 is a conceptual view to explain a method for implementing a high impedance surface (HIS) near a receiver.

FIG. 6 is a conceptual view to explain a method for implementing a high impedance surface (HIS) near a receiver.

Referring to FIG. 6, the reflection unit is composed of the conductive impedance layer 52, and the ground layer 51 disposed below the impedance layer 52. The impedance layer 52 and the ground layer 51 are electrically connected to each other. The impedance layer 52 may have a parallel configuration of unit cells, each unit cell having a capacitance component and an inductance component. An impedance surface may be expressed as the following formula 1.

$$Z = \frac{j\omega L}{(1 - \omega^2 LC)} \quad [\text{Formula 1}]$$

The impedance surface is dominated by an inductance component at a low frequency, whereas dominated by a capacitance component at a high frequency. When the a satisfies $1/(LC)^{0.5}$, an infinite impedance is theoretically implemented. Since the reflection unit was artificially implemented with respect to a Perfect Magnetic Conductor (PMC) that is implemented only theoretically, the reflection unit may be referred to as 'Artificial Magnetic Conductor (AMC)'.

Since the AMC has a reflection phase of '0', even if the antenna is located at a near distance (corresponding to a distance less than λ/4), a direct wave and a reflected wave are not attenuated from each other. Accordingly, an electromagnetic wave radiated from a portion near the receiver 14 is not transmitted to a hearing aid, thereby enhancing a HAC rating of the portable terminal. As a result, even if the antenna is mounted to a portion near the receiver 14 inside the first front case 11, an HAC rating of the portable terminal may be enhanced.

Figure 7:
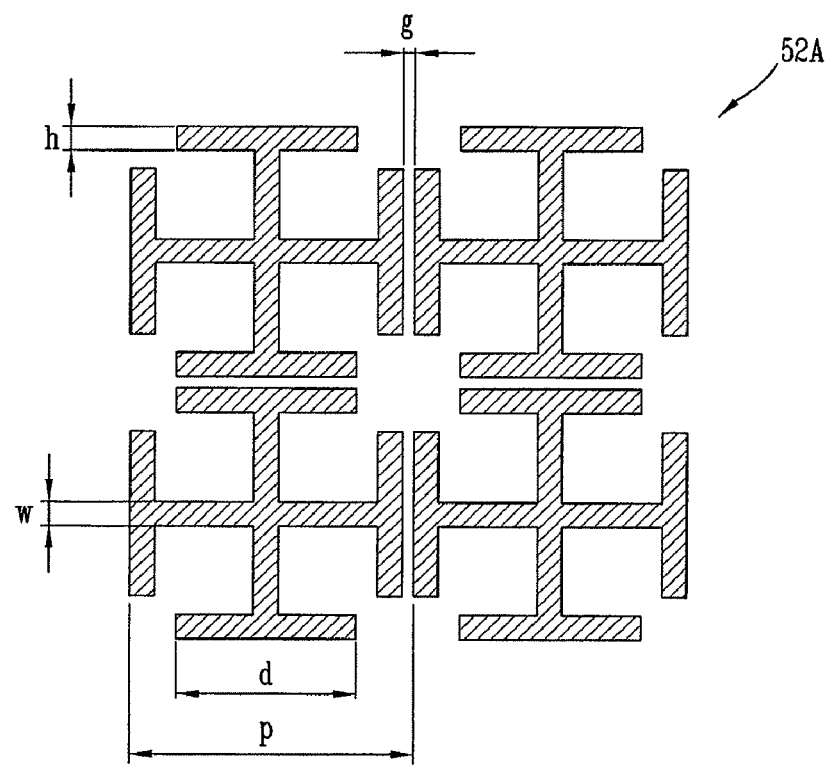
FIG. 7 is a planar view showing an impedance layer attached to a portion near a receiver of a case according to a first embodiment of the present invention.
Figure 8:
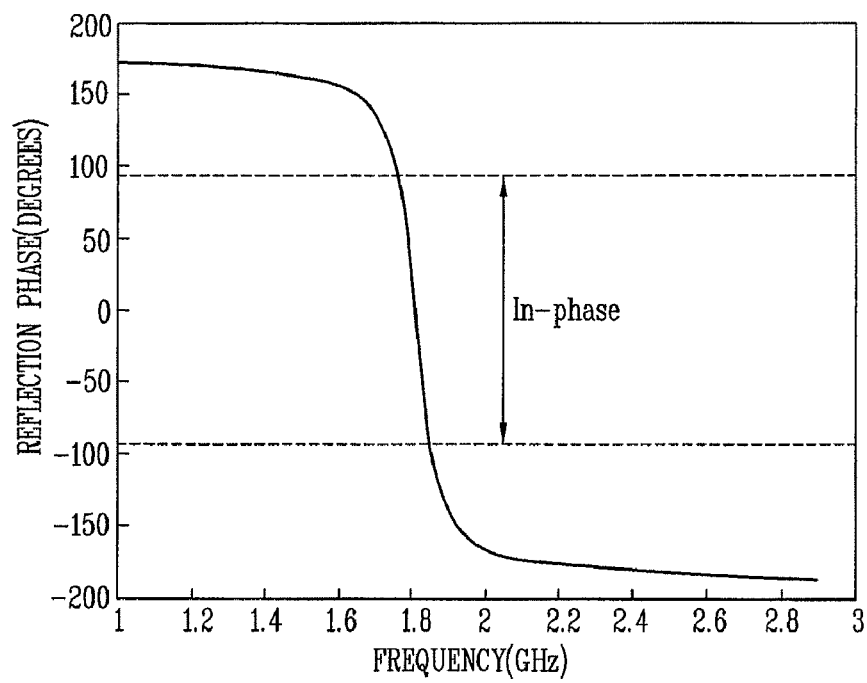
FIG. 8 is a graph indicating a measured usage result of the impedance layer of FIG. 7, which shows a reflection phase according to a frequency.

FIG. 7 is a planar view showing an impedance layer attached to a portion near a receiver of a case according to a first embodiment of the present invention, and FIG. 8 is a graph indicating a measured usage result of the impedance layer of FIG. 7, which shows a reflection phase according to a frequency.

Referring to FIG. 7, an impedance layer 52A shows a structure of Jerusalem Cross, and a reflection phase of the structure (D=0 mm, d=8 mm, w=0.4 mm, h=0.4 mm, and g=0.1 mm). Here, Rogers TMM10 ($\in_r$=9.2, thickness=2.54 mm) was used as a substrate. Referring to FIG. 8, the reflection unit is operated as an Artificial Magnetic Conductor (AMC) within a reflection phase of ±90° corresponding to 1 m76 GHz~1.85 GHz. The reflection unit is operated as a Perfect Electric Conductor (PEC) within ranges less than 1.76 GHz and more than 1.85 GHz. That is, an electromagnetic wave occurring from inside of the first front case 11 while the portable terminal 1 is operated is reflected without phase changes by the reflection unit 50. Furthermore, since a surface current flowing on the first front case 11 is forcibly shifted to the impedance layer 52A of the reflection unit 50, surface radiation of an electromagnetic wave from the first front case 11 is also prevented.

Sections where the reflection unit is operated as an Artificial Magnetic Conductor (AMC) may become different according to an operational frequency of the portable terminal 1. For this, a shape and a size of the impedance layer 52A may be controlled.

Figure 9:
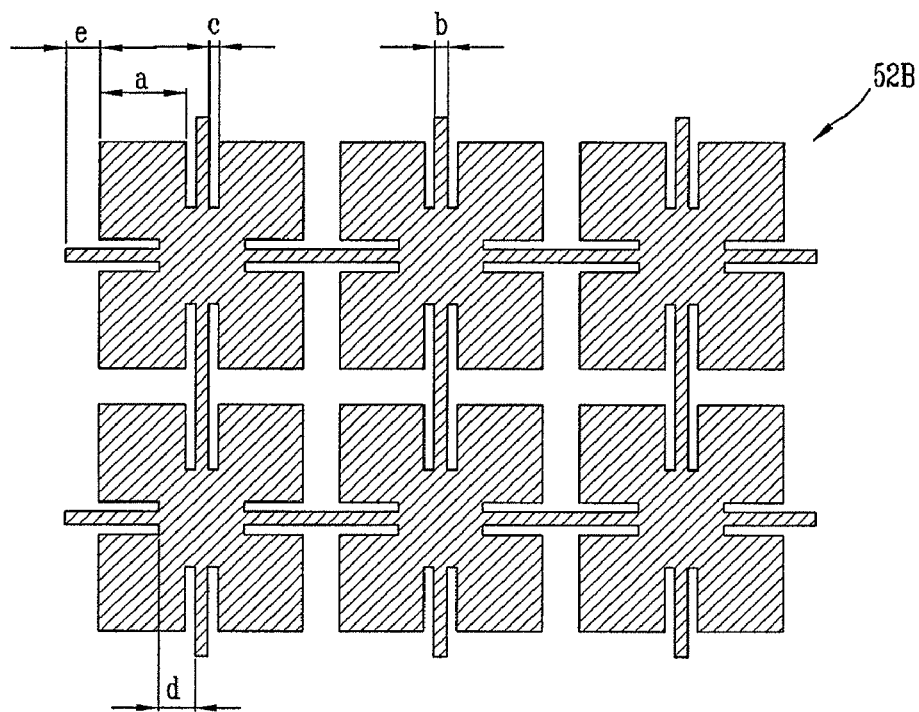
FIGS. 9 and 10 show another modification examples of the impedance layer.

FIG. 9 is a planar view showing an impedance layer 52B attached to a portion near the receiver of the case, which is a modification example of the impedance layer 52A. For instance, a substrate, FR4 epoxy ($\in$r=4.4, thickness=1 mm) may be used, thereby obtaining an Artificial Magnetic Conductor (AMC) operated at a GSM band (a=4.5 mm, b=0.1 mm, c=0.2 mm, d=2.45 mm, and e=0.75 mm), and a DCS band (a=2.475 mm, b=0.05 mm, c=0.1 mm, d=1.35 mm, and e=0.4 mm).

Figure 10:
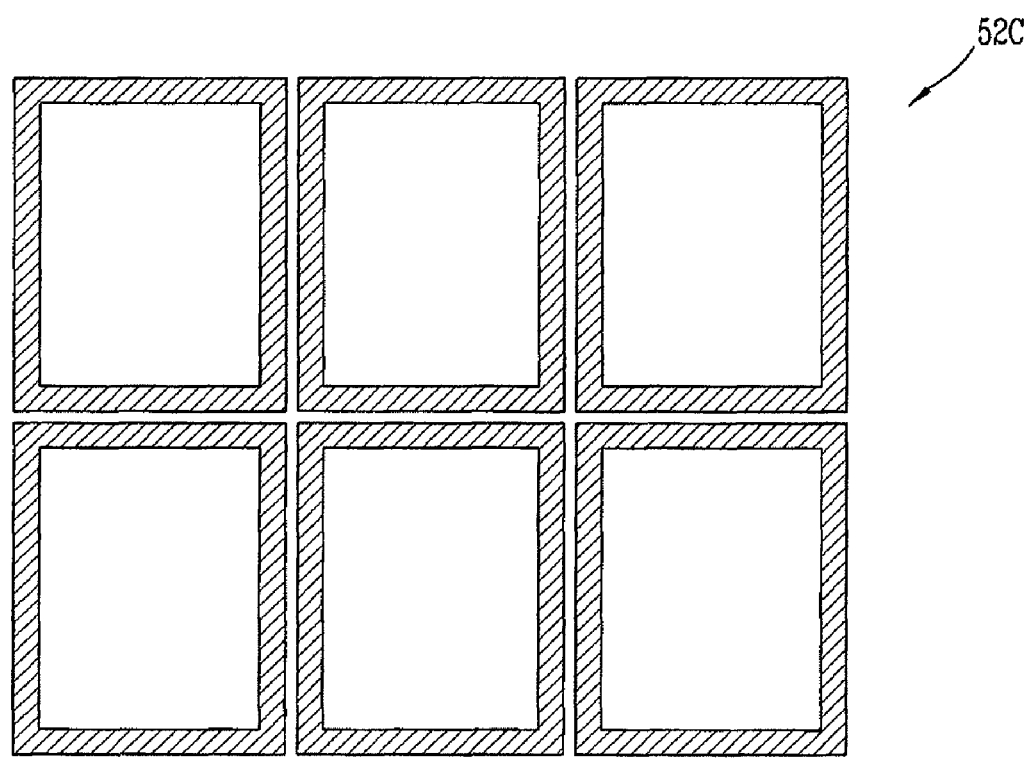

FIG. 10 is a planar view showing an impedance layer 52C attached to a portion near the receiver of the case, which is a still another modification example of the impedance layer 52A. Referring to FIG. 10, an Artificial Magnetic Conductor (AMC) is formed in a square loop shape.

The impedance layer may have a pattern of Peano structure, Hilber structure, and so on. The more the number of unit cells is, the more an impedance is increased. However, only two or more unit cells are sufficient to increase an impedance.

In the portable terminal of the present invention, the reflection unit is disposed inside the case near the receiver to which a hearing aid, etc. may approach. This may prevent an electromagnetic wave from leaking to outside of the case, thereby reducing interference of the hearing aid with the portable terminal. The reflection unit serves as an artificial magnetic conductor, and reflects an electromagnetic wave occurring from inside of the portable terminal, thereby not degrading wireless characteristics of the portable terminal.

Furthermore, since the conductive layer of the case is shorted to the impedance layer of the reflection unit, a current flowing on the surface of the case is shifted to the reflection unit. This reduces an electromagnetic wave from radiating from the surface of the case.

Figure 11:
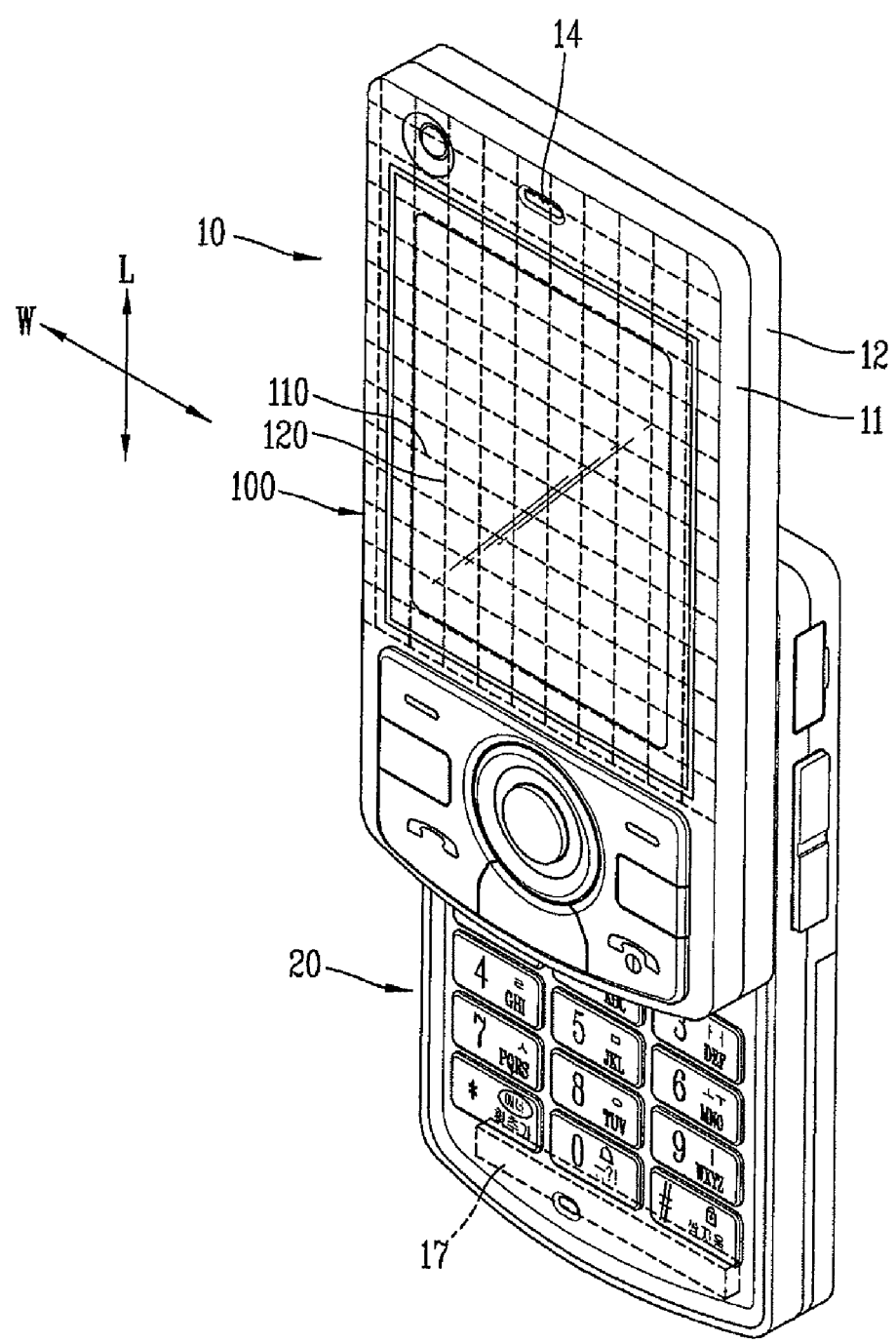
FIG. 11 is a front perspective view showing a portable terminal according to a second embodiment of the present invention.
Figure 12:
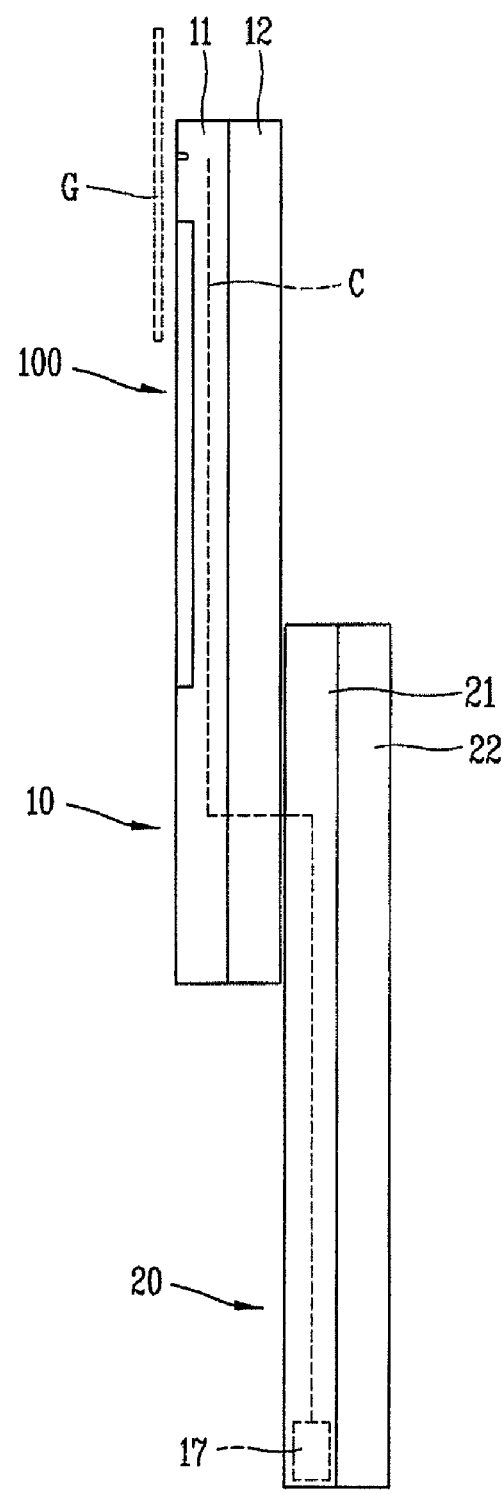
FIG. 12 is a side sectional view of the portable terminal of FIG. 11.
Figure 13:
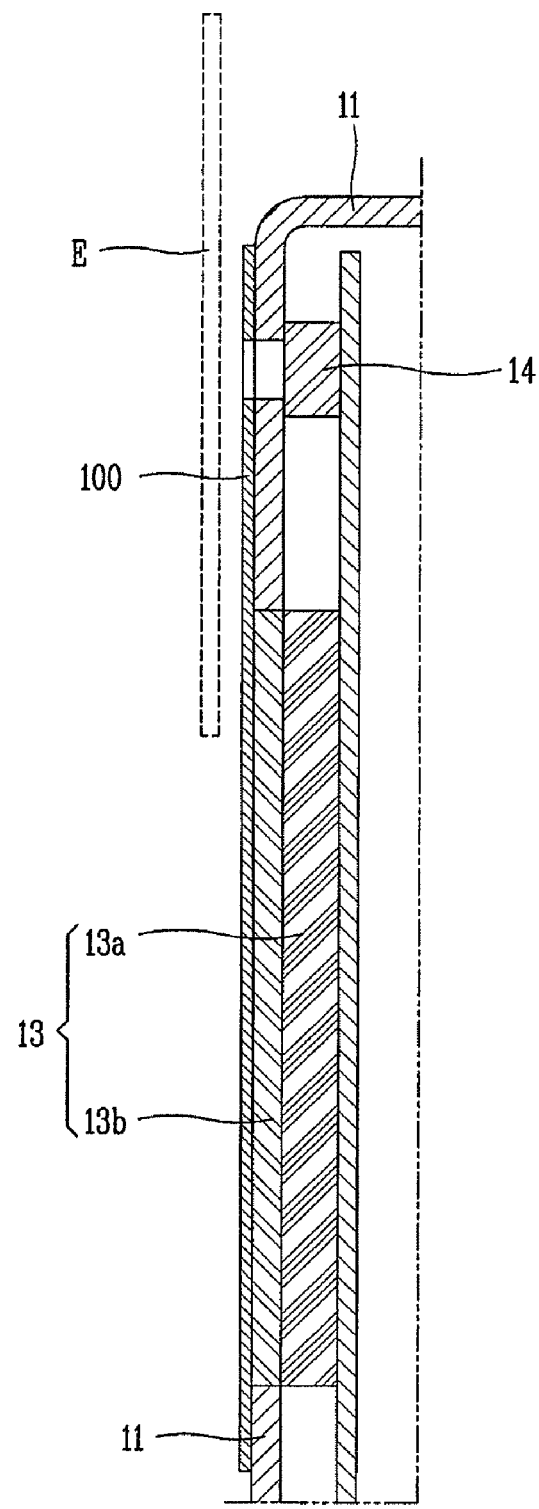
FIG. 13 is an enlarged sectional view showing a part of a first body of the portable terminal of FIG. 11.

FIG. 11 is a front perspective view showing a portable terminal according to a second embodiment of the present invention, FIG. 12 is a side sectional view of the portable terminal of FIG. 11, and FIG. 13 is an enlarged sectional view showing a part of a first body of the portable terminal of FIG. 11.

The portable terminal 1 comprises a first body 10, and a second body 20 configured to perform a sliding motion along one or more directions of the first body 10. The first body 10 and the second body 20 may be totally referred to as a body.

The modules or components aforementioned in FIG. 2 may be applied to the first body 10 or the second body 20, and their detailed explanations will be omitted.

An antenna 17 for voice communications may be disposed in the second body 20, and may be mounted to the first body 10.

The receiver 14 is exposed out through the first front case 11 of the first body 10. The antenna 17 is connected to conductive regions (C) implemented inside the first body 10 and the second body 20 and connected to each other, e.g., a ground region or an Electromagnetic Interference (EMI) region. Accordingly, an electromagnetic wave occurring when the antenna 17 is operated is propagated towards the receiver 14.

In order to prevent an electromagnetic wave occurring when the antenna 17 is operated from being detected from the grid (G) by propagating the electromagnetic wave to the receiver 14, a shielding unit 100 is formed on one or more surfaces of the first front case 11. The shielding unit 100 enhances a HAC rating by weakening a strength of an electromagnetic wave and so on at the grid (G). Since the shielding unit 100 is formed at the first front case 11, structural changes of the antenna 17 or the conductive region (C) are not required.

In order to prevent an electromagnetic wave from propagating to the grid (G) set based on the receiver 14, the shielding unit 100 is formed to be extending from a region in which the receiver is installed to a neighboring region. An electromagnetic wave has a characteristic to be diffracted while moving. Accordingly, the shielding unit 100 is preferably formed not only at a region corresponding to the grid (G), but also at a region wider than the grid (G).

For instance, the shielding unit 100 may be formed at a region where the receiver 14 is arranged, or may be extending to a region in which the window 13b is installed. As a result, as shown in FIG. 12, the shielding unit 100 may be extending to a region of the grid (G) overlapping the first body 10.

The shielding unit 100 is formed so as to shield an electromagnetic wave as a conductive material is deposited or printed on the first front case 11. Once one or more parts of the conductive material constituting the shielding unit 100 are transparent, the region extension of the shielding unit 100 scarcely influences on the function of the display unit 13. As the conductive material, preferably used is an Indium-Tin Oxide (ITO) having a transparent characteristic and not influencing on a screen quality of the display unit 13.

The conductive material may have a non-consecutive structure, e.g., a mesh structure. The shielding unit 100 of a mesh structure is not a consecutive conductor. However, since an electromagnetic wave is prevented from propagating once a conductor exists in a direction of an electric field, the shielding unit 100 may play a role to shield an electromagnetic wave.

A plurality of lines constituting the shielding unit 100 may include a group of first lines 110 extending along a width direction (W) of the first body, and a group of second lines 120 extending along a length direction (L) of the first body 10. The first lines 110 and the second lines 120 may be substantially perpendicular to each other.

Figure 14:
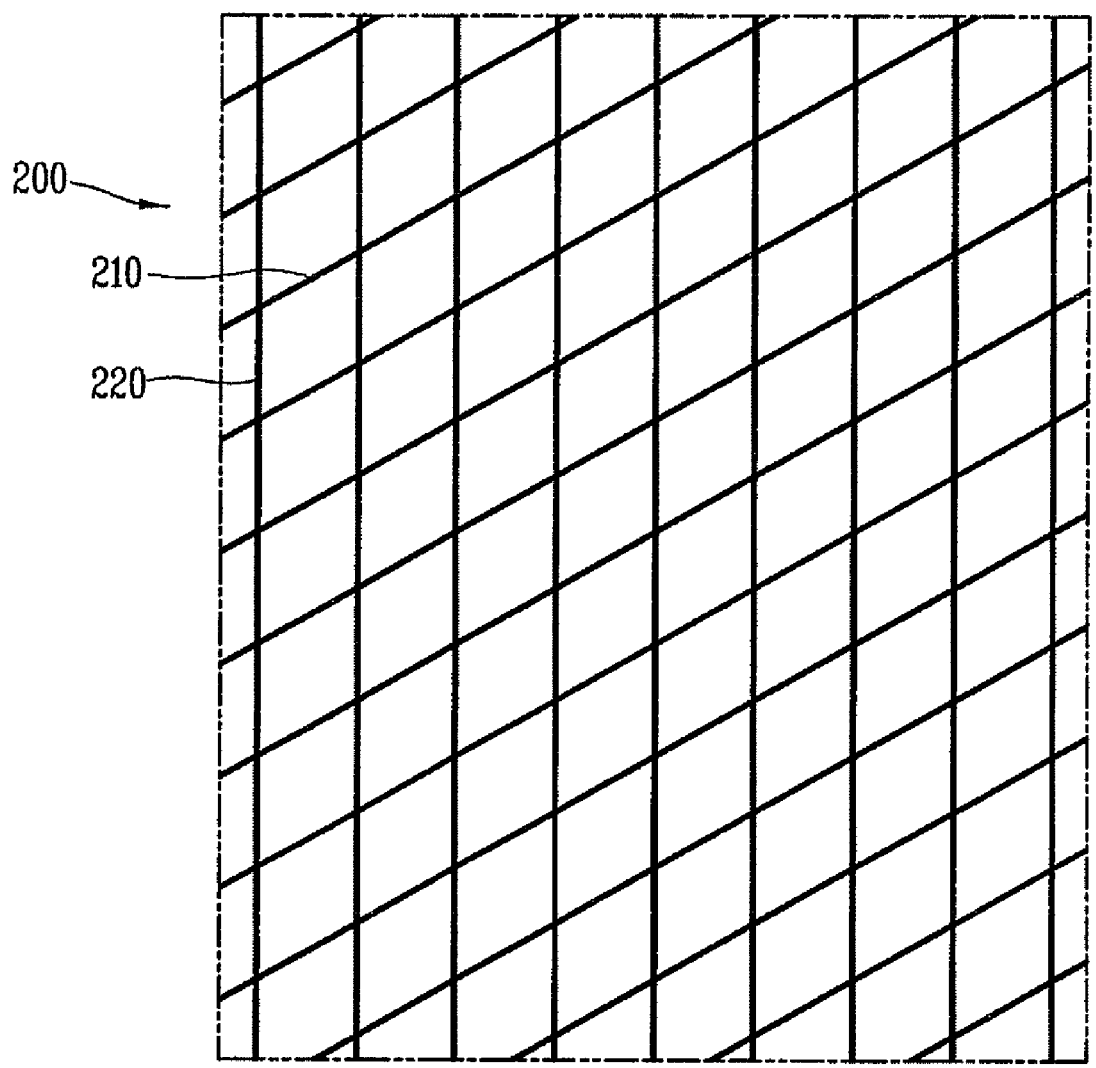
FIG. 14 shows another modification example of a mesh pattern of a shielding unit of the portable terminal of FIG. 11.

Generally, in a portable terminal operated in a GSM band, vertical polarization is more dominant than horizontal polarization. On the contrary, in a portable terminal operated in a DCS band, horizontal polarization is more dominant than vertical polarization. With consideration of this principle, arranging the first lines 110 and the second lines 120 in a direction perpendicular to each other is preferable to shield an electromagnetic wave. However, as shown in FIG. 14, the shielding unit 200 may have a mesh structure that first and second lines 210 and 220 are not substantially perpendicular to each other.

The shielding unit 100 having a mesh structure has the same electric characteristic as a Perfect Electric Conductor (PEC). Accordingly, in order to prevent degradation of a function of the antenna 17, the shielding unit 100 has to be formed in a size with consideration of a distance from the antenna 17.

Here, not only a size of the shielding unit 100, but also a position of the antenna 17 may be considered.

As shown in FIG. 11, when the antenna 17 is arranged at the second body 20 far from the shielding unit 100, especially, at a position adjacent to a lower end of the second body 20, a distance between the antenna and the shielding unit 100 extending based on the receiver 14 may be maintained within a certain range.

A HAC rating of the portable terminal is measured in a call mode in an open status shown in FIG. 11. Accordingly, once a distance between a lower end of the first body 10 and a lower end of the second body 20 is sufficiently obtained, the shielding unit 100 may be extending up to all parts of the first body 10 without consideration of the antenna 17.

Furthermore, the shielding unit 100 has to be arranged to be closer to outside than any other conductive members of the body.

For instance, when the first front case 11 is formed of a metallic material, the shielding unit 100 has to be formed on an outer surface of the first front case 11. On the contrary, when the first front case 11 is formed by a plastic injection molding, the shielding unit 100 may be formed on an inner surface of the first front case 11.

In the portable terminal shown in FIGS. 11 to 14, the shielding unit is formed on one or more surfaces of the case through which the receiver is exposed out, it is easy to form the shielding unit. Furthermore, a HAC rating can be enhanced by merely forming the shielding unit at the case without changing the structures of the antenna and the conductive member connected to the antenna. Accordingly, an inner design of the portable terminal need not be changed.

Figure 15:
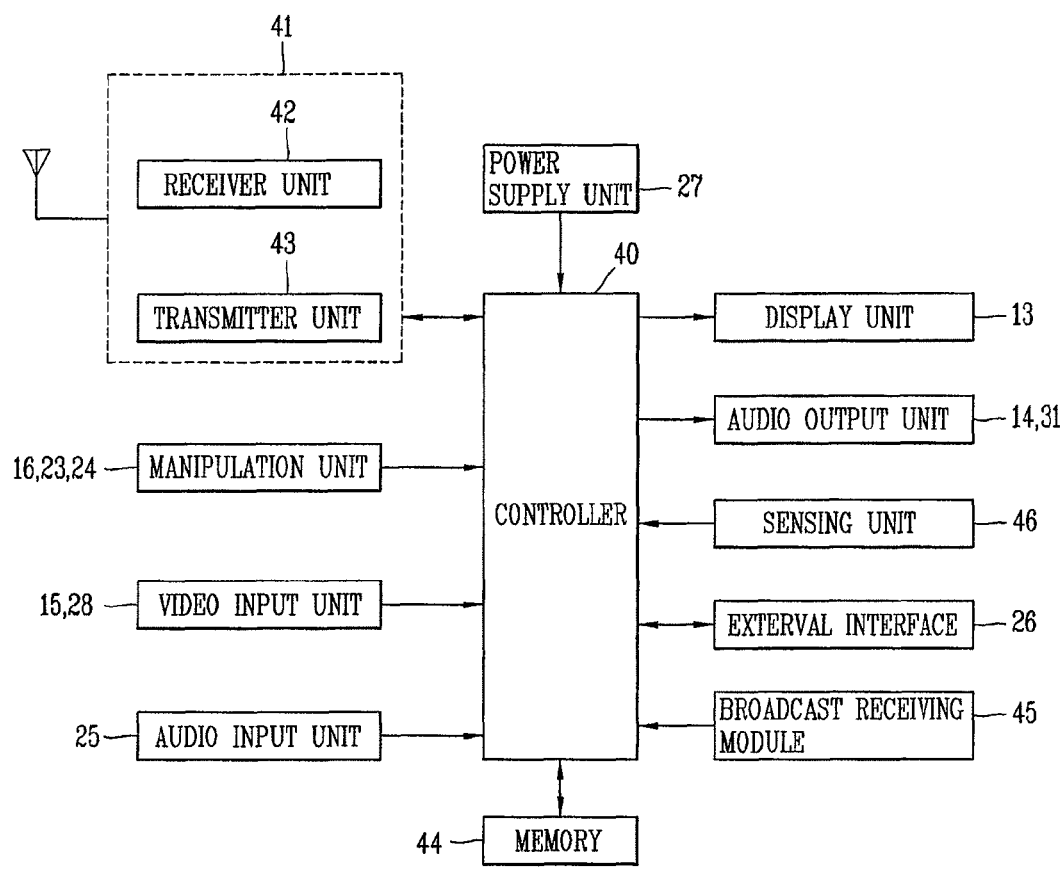
FIG. 15 is a block diagram showing the portable terminal according to the present invention.

FIG. 15 is a block diagram showing the portable terminal according to the present invention.

Referring to FIG. 15, the portable terminal according to the present invention comprises a wireless communications module 41, user input units 16, 23 and 24, video input units 15 and 28, an audio input unit 25, a display unit 13, audio output units 14 and 31, a sensing unit 46, an interface unit 26, a broadcast receiving module 45, a memory 44, a power supply unit 27, and a controller 40.

The controller 40 typically controls the overall operations of the portable terminal 1. For instance, the controller 40 performs the control and processing associated with voice calls, data communications, and video calls.

The wireless communications module 41 transmits or receives wireless signals to/from a base station through an antenna. For instance, the wireless communications module 41 transmits or receives voice data, text data, video data, and control data under control of the controller 40. And, the wireless communications module 41 includes a transmitting portion 43 for transmitting a signal through a modulation process, and a receiving portion 42 for demodulating a received signal.

As shown in FIG. 2, the user input units 16, 23 and 24 provide, to the controller 40, key input data input by a user so as to control the operation of the portable terminal 1.

The video input units 15 and 28 process image frames of still images or moving images captured by an image sensor in a video call mode or a capturing mode. Then, the processed image frames are converted into video data that can be displayed on the display unit 13, and then are output to the display unit 13.

Under control of the controller 40, the image frames processed by the video input units 15 and 28 may be stored in the memory 44, or may be outwardly transmitted through the wireless communications module 41.

The audio input unit 25 receives external audio signals by a microphone in a call mode, or a recording mode, or a voice recognition mode, and so on, and then processes the received audio signals into electric voice data.

In the case of a call mode, the processed voice data is converted into data that can be transmitted to the base station through the wireless communications module 41, and then is output to the wireless communications module 41. In the case of a recording mode, the processed voice data is output so as to be stored in the memory 44.

The audio input unit 25 may include assorted noise removing algorithms to remove noise generated in the course of receiving an external audio signal.

The display unit 13 may display information processed in the portable terminal. For instance, when the portable terminal is in a call mode, User Interface (UI) or Graphic User Interface (GUI) relating to a call is displayed under control of the controller 40. And, when the portable terminal is in a video call mode or a capturing mode, a captured image or UI or GUI is displayed under control of the controller 40. When the display unit 13 includes a touch screen, it serves as an input device as well as an output device.

In various modes including a call-receiving mode, a call-placing mode, a recording mode, a voice recognition mode and a broadcast reception mode, the audio output units 14 and 31 convert audio data received from the wireless communication module 41, or audio data stored in the memory 44 thereby to outwardly output under control of the controller 40.

The audio output units 14 and 31 output audio signals relating to functions executed in the portable terminal (e.g., call signal receiving sound, message receiving sound, and so on). The audio output units 14 and 31 include a speaker, a receiver, a buzzer, and so on.

The sensing unit 46 senses the current status of the portable terminal such as an open/close status of the portable terminal, a position of the portable terminal, and presence or absence of a user's contact with the portable terminal, thereby generating sensing signals to control the operation of the portable terminal. As an example, when the portable terminal 1 is a slide-type portable terminal, the sensing unit 46 may sense whether a sliding portion of the portable terminal 1 is open or closed. Then, the sensing unit 46 outputs results of the sensing to the controller 40, and thereby the operation of the portable terminal is controlled. Other examples include the sensing unit 46 sensing the presence or absence of power provided by the power supply unit 27, the presence or absence of coupling or other connection between the interface unit 26 and an external device, and so on.

The interface unit 26 interfaces a wire/wireless headset, an external charger, a wire/wireless data port, and a card socket (e.g., memory card, SIM/UIM card) rather than the portable terminal, with all types of external devices connected to the portable terminal. The interface 26 receives data or power from an external device, and transmits it to each component inside the portable terminal. Otherwise, the interface 26 transmits data inside the portable terminal to an external device.

The memory 44 may store a program to activate the controller 40, or may temporarily store input/output data (e.g., phonebook, messages, still images, moving images, and so on).

Furthermore, the memory 44 stores information relating to the initial position of the magnet 33. The memory 44 includes the concepts of the general hard disc, card-type memory (e.g., SD or XD memory), flash memory, RAM, ROM, and so on.

The broadcast receiving module 45 receives a broadcasting signal transmitted through satellite or terrestrial waves, etc., and converts the signal into broadcasting data that can be output to the audio output units 14 and 31, and the display unit 13 thereby to output it to the controller 40. The broadcast receiving module 45 receives broadcasting-related additional data (e.g., Electric Program Guide: EPG, channel list, etc.). Broadcasting data and additional data converted by the broadcast receiving module 45 may be stored in the memory 44.

The power supply unit 27 receives external or internal power under control of the controller 40, and supplies the power to each component of the portable terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
a terminal case having a sound hole thereon;
a receiver installed inside the sound hole; and
a reflection unit disposed between the terminal case and the receiver, for reflecting an electromagnetic wave radiated from an interior or a surface of the terminal case,
wherein the terminal case comprises a conductive layer disposed near the receiver, and
wherein the reflection unit comprises:
a ground layer disposed inside the conductive layer, and electrically insulated from the conductive layer; and
an impedance layer disposed inside the ground layer and having a parallel configuration of unit cells, wherein each unit cell comprises a capacitance component and an inductance component.

2. The portable terminal of claim 1, wherein the conductive layer is electrically shorted to the impedance layer by at least one connection member.

3. The portable terminal of claim 1, wherein the conductive layer is formed of an Electromagnetic Interference (EMI) spray.

4. The portable terminal of claim 1, wherein the ground layer and the impedance layer are spaced apart by a dielectric material.

5. The portable terminal of claim 1, wherein the impedance layer is formed as any one of Jerusalem cross, Uniplane Compact Photonic BandGap (UC-PBG) and a loop.

6. The portable terminal of claim 1, wherein the reflection unit is formed as any one of Printed Circuit Board (PCB) type, printing type, and in-mold type.

7. The portable terminal of claim 1, wherein the reflection unit is formed on a front portion and a side portion of the terminal case.

8. The portable terminal of claim 1, wherein the reflection unit is configured to form an Artificial Magnetic Conductor (AMC).

9. A portable terminal, comprising:
a terminal body comprising a plurality of cases, and having an antenna therein;
a display unit installed inside the plurality of cases; and
a window attached to any one of the plurality of cases such that the window is positioned in front of the display unit,
a receiver installed in any one of the plurality of cases so as to be exposed out through the case; and
a shielding unit formed on at least one surface of the plurality of cases, for shielding an electromagnetic wave radiated from the antenna and propagated to the receiver,
wherein the shielding unit is formed on a region in which the window and the receiver are located and configured to have a coverage extending from a region in which the receiver is installed to a neighboring region.

10. The portable terminal of claim 9, wherein the shielding unit is located outermost among conducive members installed in the terminal body.

11. The portable terminal of claim 9, wherein the antenna is disposed in one of a first end portion and a second end portion of the terminal body, and
wherein the receiver is not located in the one of a first end portion and a second end portion.

12. A portable terminal, comprising:
a terminal body comprising a plurality of cases, and having an antenna therein;
a receiver installed in any one of the plurality of cases so as to be exposed out through the case; and
a shielding unit formed on at least one surface of the plurality of cases, for shielding an electromagnetic wave radiated from the antenna and propagated to the receiver,
wherein the shielding unit is configured to have a coverage extending from a region in which the receiver is installed to a neighboring region, and
wherein the shielding unit is formed of a conductive material and laminated on at least one surface of the plurality of cases.

13. The portable terminal of claim 12, wherein at least one portion of the conductive material is transparent.

14. The portable terminal of claim 13, wherein the conductive material comprises Indium-Tin Oxide (ITO).

15. The portable terminal of claim 13, wherein the conductive material has a meshed pattern.

16. The portable terminal of claim 15, wherein the meshed pattern comprises a first group of lines and a second group of lines, wherein the second group of lines are substantially perpendicular to the first group of lines.

17. The portable terminal of claim 16, wherein the first group of lines are substantially parallel to a lengthwise direction of the terminal body, and the second group of lines are substantially parallel to a widthwise direction of the terminal body.

* * * * *